United States Patent
de los Reyes

(10) Patent No.: US 9,727,151 B2
(45) Date of Patent: Aug. 8, 2017

(54) AVOIDING ACCIDENTAL CURSOR MOVEMENT WHEN CONTACTING A SURFACE OF A TRACKPAD

(71) Applicant: GOOGLE INC., Mountain View, CA (US)

(72) Inventor: Andrew de los Reyes, Belmont, CA (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 14/688,645

(22) Filed: Apr. 16, 2015

(65) Prior Publication Data

US 2016/0306449 A1    Oct. 20, 2016

(51) Int. Cl.
G06F 3/0354    (2013.01)
G06F 3/041    (2006.01)
G06F 3/038    (2013.01)

(52) U.S. Cl.
CPC .......... *G06F 3/03547* (2013.01); *G06F 3/038* (2013.01); *G06F 3/0416* (2013.01); *G06F 3/0418* (2013.01)

(58) Field of Classification Search
CPC .... G06F 3/03547; G06F 3/038; G06F 3/0418; G06F 3/0416
See application file for complete search history.

(56) References Cited

U.S. PATENT DOCUMENTS

| | | | |
|---|---|---|---|
| 5,889,511 A | 3/1999 | Ong et al. | |
| 6,657,639 B2 | 12/2003 | Yu | |
| 7,339,580 B2 | 3/2008 | Westeman et al. | |
| 7,408,538 B2 | 8/2008 | Hinckley et al. | |
| 7,532,202 B2 | 5/2009 | Roberts | |
| 8,445,793 B2 | 5/2013 | Westerman et al. | |
| 8,970,525 B1 | 3/2015 | De Los Reyes | |
| 2003/0210235 A1 | 11/2003 | Roberts | |
| 2006/0038796 A1 | 2/2006 | Hinckley et al. | |
| 2006/0050062 A1 | 3/2006 | Ozawa et al. | |

(Continued)

FOREIGN PATENT DOCUMENTS

| | | |
|---|---|---|
| EP | 2624103 A2 | 8/2013 |
| WO | 2016/168365 A1 | 10/2016 |

OTHER PUBLICATIONS

International Search Report and Written Opinion received for PCT Patent Application No. PCT/US2016/027372, mailed on Jun. 13, 2016, 11 pages.

(Continued)

*Primary Examiner* — Jimmy H Nguyen
*Assistant Examiner* — Yaron Cohen
(74) *Attorney, Agent, or Firm* — Brake Hughes Bellermann LLP

(57) ABSTRACT

In one general aspect, a method can include identifying a contact on a surface of a trackpad of a computing device, calculating a value of a first speed of movement of the contact along the surface of the trackpad, calculating a value of a total distance moved by the contact along the surface of the trackpad, and blocking movement of a cursor on a display device based on determining that the value of the first speed of movement of the contact along the surface of the trackpad is less than a fast threshold speed, and based on determining that the value of the total distance moved by the contact along the surface of the trackpad is less than a threshold distance value.

20 Claims, 10 Drawing Sheets

(56) References Cited

U.S. PATENT DOCUMENTS

| | | |
|---|---|---|
| 2007/0081726 A1 | 4/2007 | Westeman et al. |
| 2007/0097081 A1 | 5/2007 | Ohshita et al. |
| 2008/0012835 A1 | 1/2008 | Rimon et al. |
| 2008/0036743 A1 | 2/2008 | Westerman et al. |
| 2009/0174675 A1 | 7/2009 | Gillespie et al. |
| 2012/0007821 A1 | 1/2012 | Zaliva |
| 2012/0019468 A1 | 1/2012 | Westerman et al. |
| 2012/0023459 A1* | 1/2012 | Westerman ......... G06F 3/03547 715/863 |
| 2012/0050210 A1 | 3/2012 | King et al. |
| 2012/0158629 A1 | 6/2012 | Hinckley et al. |
| 2012/0182296 A1 | 7/2012 | Han |
| 2012/0293440 A1 | 11/2012 | Hotelling et al. |
| 2013/0149964 A1 | 6/2013 | Kreiner |
| 2013/0194200 A1 | 8/2013 | Zanone et al. |

OTHER PUBLICATIONS

"Ignore Finger Resting at Bottom of Unibody Macbook Pro Touchpad?", Ubuntu forums, retrieved on Jun. 27, 2012 from <http://ubuntuforums.org/showthread.php?t=1440747>, 3 pages.
"Ignore Finger Resting at the Bottom of Trackpad [unibody macbook pro]", retrieved on Jun. 27, 2012, from <askubuntu.com/questions/105097/ignore-finger-resting-at-the-bottom-of-trackpad-unibody-macbook-pro>, 2 pages.

* cited by examiner

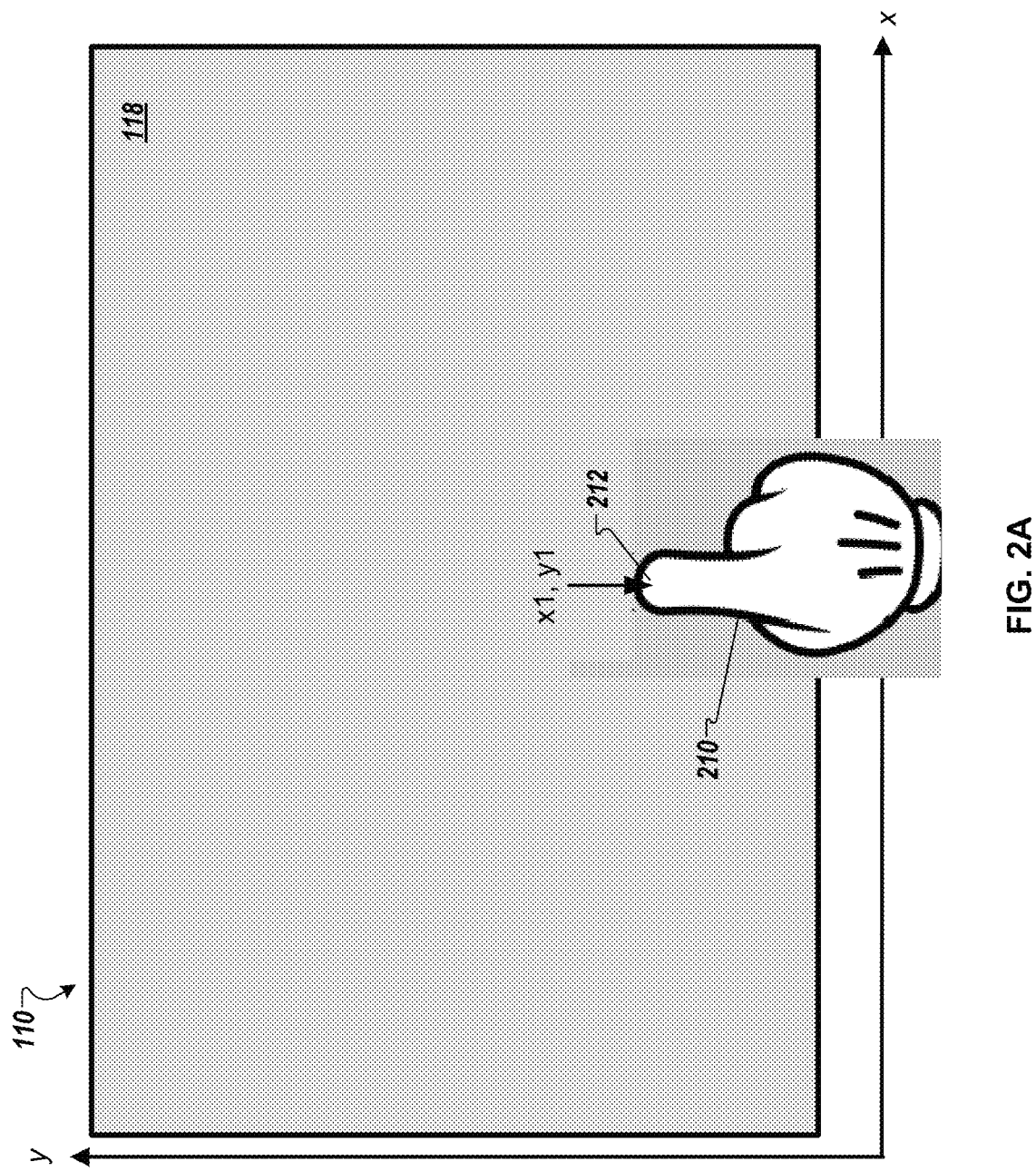

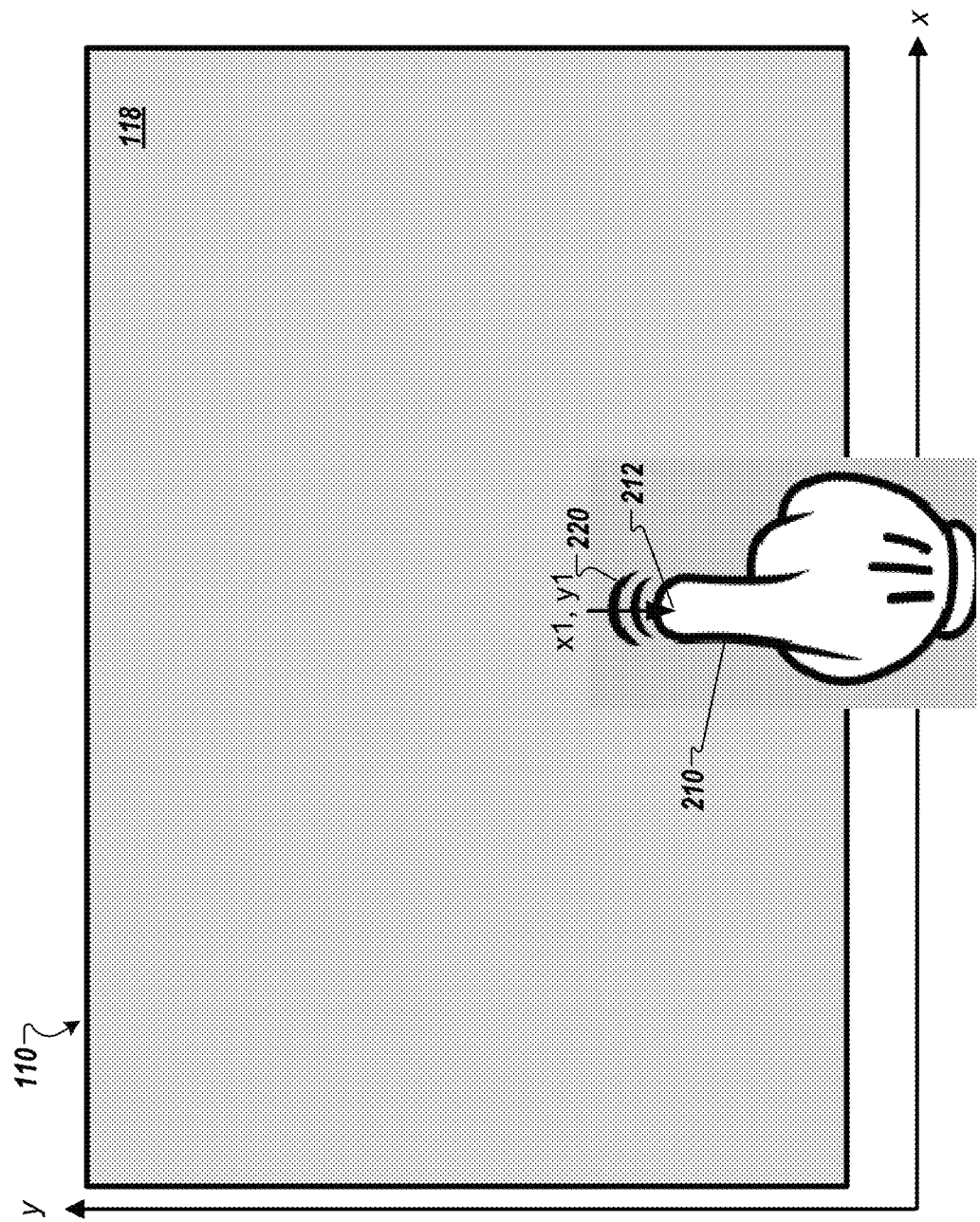

AVOIDING ACCIDENTAL CURSOR MOVEMENT WHEN CONTACTING A SURFACE OF A TRACKPAD

TECHNICAL FIELD

This application relates to an input device (e.g., a trackpad) for use with a computing device, and more specifically, to avoiding accidental cursor movement on a display device included in the computing device when contacting a surface of a trackpad.

BACKGROUND

A computing device can include one or more input devices, such as a keyboard, a mouse, a trackpad, a touchpad, a pointing stick, one or more mouse buttons, a trackball, a joystick, a microphone, and a touchscreen display (that can also provide visual output to the user). Non-limiting examples of a computing device can include, but are not limited to, a mobile computing device (e.g., a mobile phone, a personal digital assistant (PDA), a smartphone), a laptop computer, a desktop computer, a notebook computer, a tablet, or a server. In some implementations, a trackpad or touchpad can be coupled to, or integrated within, a computing device. The trackpad or touchpad can be used in place of or in addition to a mouse to maneuver a cursor on a screen (display) included in the computing device. In addition or in the alternative, a trackpad or touchpad can be used to trigger one or more functions of the computing device. Such trackpads or touchpads can be coupled to, or integrated within, the computing device.

A touchpad (also referred to herein interchangeably as a trackpad) is a pointing device that includes a tactile sensor. A tactile sensor is a specialized surface that can translate motion and position of fingers of a user on the specialized surface to a relative position of a cursor on a screen (display). Touchpads can be included in laptop computers and/or mobile devices. For example, when desktop space is limited, a touchpad can be used as a substitute for a mouse. Touchpads of varying sizes can be included in mobile computing devices. Wired or wireless touchpads are also available as computer accessories.

SUMMARY

In one general aspect, a method can include identifying a contact on a surface of a trackpad of a computing device, calculating a value of a first speed of movement of the contact along the surface of the trackpad, calculating a value of a total distance moved by the contact along the surface of the trackpad, and blocking movement of a cursor on a display device based on determining that the value of the first speed of movement of the contact along the surface of the trackpad is less than a fast threshold speed, and based on determining that the value of the total distance moved by the contact along the surface of the trackpad is less than a threshold distance value.

Example implementations may include one or more of the following features. For instance, the method can further include calculating a value of a previous speed of movement of the contact along the surface of the trackpad before calculating the value of the first speed of movement. The method can further include blocking movement of the cursor on the display device included in the computing device based on determining that the calculated value of the previous speed of movement of the contact along the surface of the trackpad equal to or less than a slow threshold speed. The method can further include calculating a value of a previous speed of movement of the contact along the surface of the trackpad before calculating the value of the first speed of movement. The method can further include allowing movement of the cursor on the display device included in the computing device based on determining that the calculated value of the previous speed of movement of the contact along the surface of the trackpad is greater than a slow threshold speed. Blocking movement of a cursor on a display device can include blocking scrolling of information on the display device. The method can further include allowing movement of a cursor on a display device included in the computing device, based on determining that the value of the first speed of movement of the contact along the surface of the trackpad is equal to or greater than the fast threshold speed. Calculating a value of a first speed of movement of the contact along the surface of the trackpad can include calculating the value of the first speed of movement of the contact to be a distance between a current (x,y) coordinate and a previous (x,y) coordinate over a period of time. The period of time can be the time between two frames of input data. Calculating a value of a total distanced moved by the contact along the surface of the trackpad can include calculating the value of the total distance to be an accumulated sum of distances moved by the contact along the surface of the trackpad. The method can further include allowing movement of a cursor on a display device included in the computing device, based on determining that the value of the total distance moved by the contact along the surface of the trackpad is greater than or equal to the threshold distance value.

In another general aspect, a non-transitory, machine-readable medium having instructions stored thereon, the instructions, when executed by a processor, can cause a computing device to identify a contact on a surface of a trackpad of a computing device, calculate a value of a first speed of movement of the contact along the surface of the trackpad, calculate a value of a total distance moved by the contact along the surface of the trackpad, and block movement of a cursor on a display device based on determining that the value of the first speed of movement of the contact along the surface of the trackpad is less than a fast threshold value, and based on determining that the value of the total distance moved by the contact along the surface of the trackpad does not exceed a threshold distance value.

Example implementations may include one or more of the following features. For instance, the instructions, when executed by the processor, can further cause the computing device to calculate a value of a previous speed of movement of the contact along the surface of the trackpad before calculating the value of the first speed of movement and block movement of the cursor on the display device included in the computing device based on determining that the calculated value of the previous speed of movement of the contact along the surface of the trackpad is equal to or less than a slow threshold speed. The instructions, when executed by the processor, can further cause the computing device to calculate a value of a previous speed of movement of the contact along the surface of the trackpad before calculating the value of the first speed of movement and allow movement of the cursor on the display device included in the computing device based on determining that the calculated value of the previous speed of movement of the contact along the surface of the trackpad is greater than a slow threshold speed. Blocking movement of a cursor on a display device can include blocking scrolling of information on the display device. The instructions, when executed by the processor, can further cause the computing device to allow movement of a cursor on a display device included in the computing device, based on determining that the value of the first speed of movement of the contact along the surface of the trackpad is equal to or greater than the fast threshold speed. The instructions, when executed by the processor, that cause the computing device to calculate a value of a first speed of movement of the contact along the surface of the trackpad can include instructions that, when executed by the processor, cause the computing device to calculate the value of the first speed of movement of the contact to be a distance between a current (x,y) coordinate and a previous (x,y) coordinate over a period of time. The period of time can be the time between two frames of input data. The instructions, when executed by the processor, that cause the computing device to calculate a value of a total distance moved by the contact along the surface of the trackpad can include instructions that, when executed by the processor, cause the computing device to calculate the value of the total distance to be an accumulated sum of distances moved by the contact along the surface of the trackpad. The instructions, when executed by the processor, can further cause the computing device to allow movement of a cursor on a display device included in the computing device, based on determining that the value of the total distance moved by the contact along the surface of the trackpad is greater than or equal to the threshold distance value.

In yet another general aspect, a trackpad can include a surface, a sensor, a controller, a bus, a kernel driver and a gesture library. The sensor can be operatively coupled to the surface and configured to identify a contact on the surface of the trackpad. The controller can be operatively coupled to the sensor and configured to calculate a value of a first speed of movement of the contact along the surface of the trackpad, and calculate a value of a total threshold distance moved by the contact along the surface of the trackpad. The bus can be operatively coupled to the controller. The kernel driver can be configured to communicate with the bus. The gesture library can be configured to communicate with the kernel driver. The gesture library can include executable code to not translate the movement of the contact on the surface of the trackpad to movement of a cursor on a display device based on determining that the value of the first speed of movement of the contact along the surface of the trackpad is less than a fast threshold speed, and based on determining that the value of the total distance moved by the contact along the surface of the trackpad is less than a threshold distance value.

Example implementations may include one or more of the following features. For instance, the controller can be further configured to calculate a value of a previous speed of movement of the contact along the surface of the trackpad before calculating the first speed of movement. The gesture library can be further configured to not translate the movement of the contact on the surface of the trackpad to movement of the cursor on the display device, based on determining that the calculated value of the previous speed of movement of the contact along the surface of the trackpad is equal to or less than a slow threshold speed. The controller can be further configured to calculate a value of a previous speed of movement of the contact along the surface of the trackpad before calculating the value of the first speed of movement. The gesture library can be further configured to translate the movement of the contact on the surface of the trackpad to movement of the cursor on the display device, based on determining that the calculated value of the previous speed of movement of the contact along the surface of the trackpad is greater than the slow threshold speed. The controller can be further configured to translate the movement of the contact on the surface of the trackpad to movement of the cursor on the display device, based on determining that the value of the first speed of movement of the contact along the surface of the trackpad is greater than or equal to the fast threshold speed. The controller can be further configured to translate the movement of the contact on the surface of the trackpad to movement of the cursor on the display device, based on determining that the value of the total distance moved by the contact along the surface of the trackpad is greater than or equal to the threshold distance value.

The details of one or more implementations are set forth in the accompanying drawings and the description below. Other features will be apparent from the description and drawings, and from the claims.

BRIEF DESCRIPTION OF THE DRAWINGS

FIG. 2A is an example block diagram of a top view of an input device showing a finger of a user contacting the surface.

FIG. 2C is an example block diagram of a top view of an input device showing a finger of a user contacting a surface of a trackpad while unintentionally moving the finger.

Like reference symbols in the various drawings indicate like elements.

DETAILED DESCRIPTION

Figure 1A:
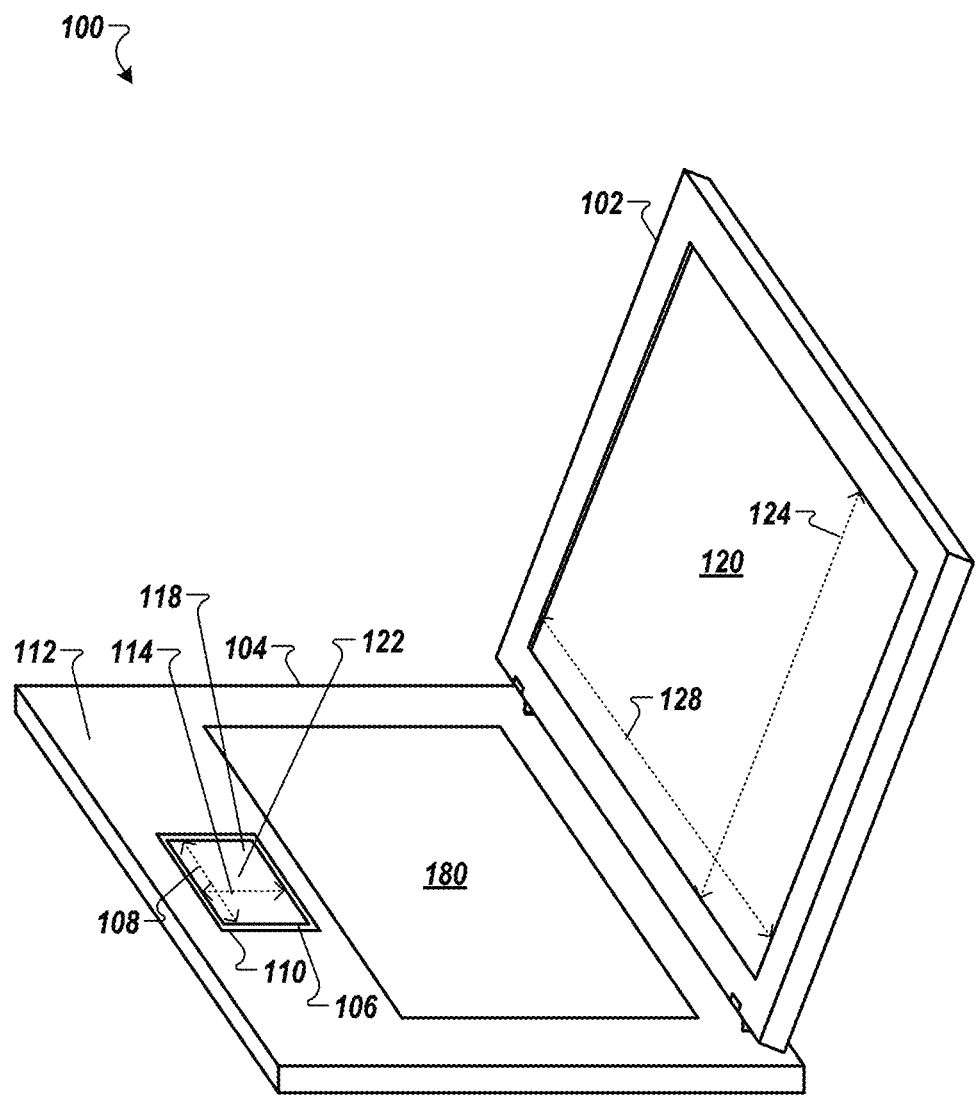
FIG. 1A is an example block diagram of a computing device that includes input devices.

In some situations, when a finger of a user is first set/placed in contact with a surface of a trackpad included in a computing device, the center of the finger that sets the coordinate of the contact of the finger with the surface of the trackpad can unintentionally move slightly. The slight movement can cause the reflection or translation of the unintentional movement to unintentional movement of a cursor on a display device. This unintentional cursor movement can be referred to herein as "cursor wobble". In addition or in the alternative, when a finger of a user is lifted/removed from contacting the surface of the trackpad, the finger can unintentionally move, slide, or otherwise make and break contact with the surface of the trackpad. The unintentional movement can cause the reflection or translation of the unintentional movement to unintentional movement of a cursor on a display device. This unintentional cursor movement can be referred to herein as "cursor wobble".

Cursor wobble can occur during click events on the trackpad. Cursor wobble can occur on an edge of the trackpad, for example, when a part of a finger of the user is placed on the trackpad and a part of the finger is placed off of the trackpad. Cursor wobble can occur when a user intends to use two fingers to perform a right click, but cursor wobble causes a cursor to move off of the selected item resulting in the failure of the right click (or the right click providing information not desired by the user). Other issues may arise when fingers are resting on a portion of the trackpad (such as a dampened zone) and the resting fingers are misinterpreted as gesturing to perform scrolling on the display device. In some situations, cursor wobble can result in the selection of an unintended link.

An input device for use with a computing device can communicate with and control operations of the computing device. The input device can be configured to be contacted by a user on a top surface of the input device to trigger an electronic signal within the computing device. For example, a user can slide or move one or more fingers, or, in some cases, knuckles or a portion of a hand, across the top surface of the input device to move a cursor visible on a display of the computing device. The input device can also include a "click" function to allow the user to, for example, click or select items presented on the display device, or to actuate a right click function. Various input devices described herein can allow a user to actuate a click function by exerting or applying a force on a top surface of the input device at any location on the top surface. In some implementations, the input device may not have a specific sensor location that the user finds to actuate a click function. In other implementations, the input device may include a portion (e.g., a bottom third of a trackpad) that the user may depress (e.g., with a certain amount of pressure) to actuate a click function. The input device can provide a consistent tactile response to the user when the user clicks on any portion of the top surface of the input device.

As used herein, a reference to a top view in a figure refers to a view as viewed by a user during use of an input device. For example, a top view can refer to a view of the input device as disposed within a computing device such that the user can contact the top surface of the input device to initiate an action within the computing device.

FIG. 1A is an example block diagram of a computing device 100 that includes input devices (e.g., a trackpad 110 and a keyboard portion 180). The computing device 100 includes a display portion 102 and a base portion 104. The display portion 102 includes a display device 120. Example display devices can include, but are not limited to, a liquid crystal display (LCD), a light emitting diode (LED) display, or other type of electronic visual display device. The base portion 104 can include a trackpad 110, a housing 112, and a keyboard portion 180. For example, the keyboard portion 180 can include a keyboard. In some implementations, the keyboard can be implemented as a mechanical keyboard. In some cases, the keyboard can be implemented as a virtual keyboard. In these implementations, the keyboard portion 180 may be a touchpad or other type of touch-sensitive surface.

The computing device 100 can be a laptop computing device as shown in the example in FIG. 1A. The computing device can also include, but is not limited to, a mobile computing device (e.g., a personal digital assistant (PDA), a mobile phone, a smartphone), a tablet computer, and a notebook computer. In some implementations, the trackpad 110 can be incorporated with a keyboard in an external device that can be interfaced to/connected to a computing device using a wired or wireless connection that incorporates a wired and/or wireless communication protocol (e.g., WiFi, Bluetooth, Bluetooth Low Energy (LE), Universal Serial Bus (USB), etc.).

The components of the input devices included in the computing device 100 (e.g., trackpad 110, keyboard portion 180) and described herein can be formed with a variety of different materials such as plastic, metal, glass, ceramic, etc. used for such components. For example, a cover member 106 included in the trackpad 110 and a base portion 104 of the computing device 100 can each be formed, at least in part, with an insulating material and/or conductive material such as a stainless steel material, for example, SUS301 or SUS304.

Figure 1B:
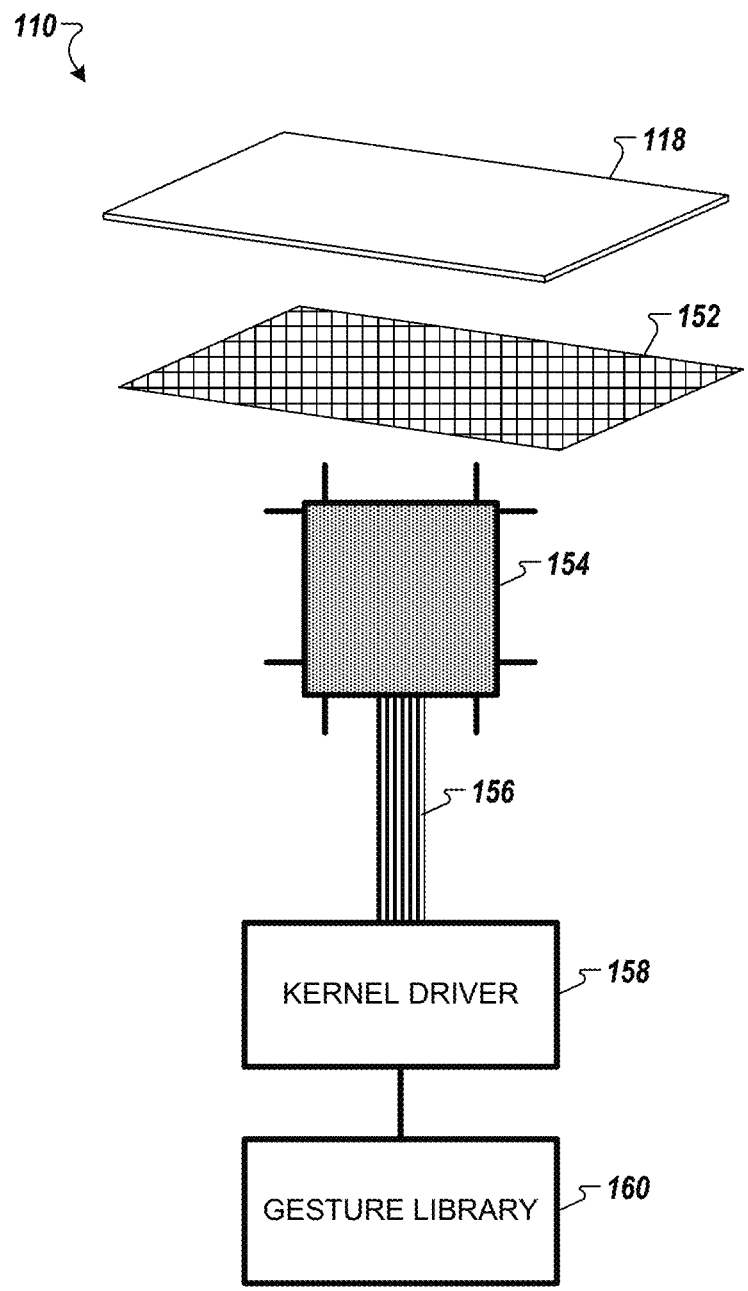
FIG. 1B is an example block diagram of a trackpad that shows example components included in the trackpad.

FIG. 1B is an example block diagram of a trackpad (e.g., the trackpad 110 as shown in FIG. 1A) that shows example components included in the trackpad. The trackpad 110 includes the top surface 118 (as shown in FIG. 1A), a sensor 152, a controller 154, a bus 156, a kernel driver 158, and a gesture library 160.

Referring to FIGS. 1A and 1B, the trackpad 110 can be configured to receive inputs (e.g., a touch, swipe, scroll, drag, click, hold, tap, combination of inputs, etc.) by a user. The sensor 152 can be activated when a user enters an input on the top surface 118 of the trackpad 110. The sensor 152 can communicate electronic signals to components and devices included in the computing device 100 in order to process the received inputs into movement of a cursor on a display of a display device (e.g., the display device 120) included in computing device 100.

As shown in FIG. 1A, a trackpad width 108 can be less than a display width 128 and a trackpad height 114 can be less than a display height 124. In some implementations, a distance on the trackpad 110 of a movement of a finger may not be reflected in a one-to-one correspondence to a distance of a movement of a cursor on the display device 120. In some cases, movement of a finger of a user on the trackpad 110 a particular distance can be reflected as a movement of a cursor displayed on the display device 120 a distance greater than the particular distance. In some implementations, a distance on the trackpad 110 of a movement of a finger may be reflected in a one-to-one correspondence to a distance of a movement of a cursor on the display device 120. In these implementations, since the area of the trackpad 110 is less than the area of the display device 120, user finger movements across the trackpad 110 can be limited to a portion of the area of the display device 120. A user can move to different areas of the display device 120 by swiping across the surface of the trackpad 110.

A trackpad and associated device driver software for a trackpad can interpret particular finger movements and interactions with the trackpad as equivalent to mouse button clicks. In some implementations, a trackpad and associated device driver software for the trackpad can interpret a finger of a user tapping the trackpad surface 118 as a click (e.g., equivalent to clicking a mouse button). The click can be interpreted as a selection of an item or object being pointed to by a cursor on the display device 120. The finger tapping can be a brief contact of the finger of the user with the surface of the trackpad. In addition, if followed by a continuous motion of the finger of the user across the surface of the trackpad (referred to as a "click-and-a-half"), the finger tapping and continuous motion can be interpreted as clicking and then dragging (e.g., selecting and then moving of the item on the display device 120).

In some implementations, a tactile trackpad can allow for clicking and further continuous motion (dragging) across a surface of the trackpad by incorporating button functionality into the surface of the trackpad (e.g., the surface 118 of the trackpad 110). To point to and select an item or object, a user can press down on the surface 118 of the trackpad 110 instead of a pressing a physical button. To drag the item across the display, instead of performing a "click-and-a-half" technique, a user may press a finger of the user down on the surface 118 of the trackpad 110 while a cursor is positioned on the item or object shown on the display device 120, drag the finger of the user across the surface 118 of the trackpad 110 without releasing the pressure, and then lifting the finger of the user off of the surface of the trackpad (releasing the pressure) when the dragging is completed.

While applying and releasing pressure applied by a finger of a user on the surface of the trackpad 110 (pressing down and lifting off of the finger of the user on the surface 118 of the trackpad 110), a finger of the user may shake, wobble, or slightly move when contacting the surface 118 of the trackpad 110. The shaking, wobbling or slight movement can be considered unintentional movement of the finger of the user on the surface 118 of the trackpad yet may be reflected, unintentionally, in movement of the cursor causing cursor wobble. It is desirable, therefore, not to translate the unintentional movement to any movement of the cursor on the display device 120. In some cases, when a finger of the user first contacts or touches the trackpad 110, inadvertent small movement (or movements) of the finger of the user can be reflected, unintentionally, in movement of the cursor causing cursor wobble.

In some implementations, a trackpad and associated device driver software for the trackpad can interpret multiple fingers of the user (e.g., two or more fingers of the user) contacting the surface 118 of the trackpad 110 as equivalent to actions of other mouse buttons. For example, two fingers tapping the touchpad can be interpreted as clicking a center button on a mouse.

In some implementations, if a trackpad is positioned close to a keyboard it may be possible for a thumb of a user to inadvertently contact the surface of the trackpad while the user is typing on a keyboard. It is desirable for the inadvertent contact of the thumb of the user with the surface of the trackpad not be interpreted as movement of a cursor on the display device.

In some implementations, a trackpad can include one or more locations on the trackpad where particular finger movements and interactions with the trackpad provide for functionality beyond that of a mouse. For example, moving a finger of a user along an edge of the trackpad can mimic interaction with a scrollbar, reflected as scrolling a window on the display device either vertically or horizontally. In some implementations, a user dragging two fingers of the user on the surface of the trackpad can be interpreted as scrolling. In some implementations, a trackpad can include a tap zone or area on the trackpad. Tapping a finger of the user on the tap zone can execute a function (e.g., launch an application, pause streaming media) on the computing device.

In some implementations, the trackpad 110 can be a multi-touch trackpad that can sense any number of fingers (such as up to five or more) simultaneously. This can provide more options for input, such as the ability to bring up a menu by tapping two fingers, dragging two fingers for scrolling, or gestures for zoom in or zoom out or rotate. Although the trackpad 110 is depicted as a rectangle, it will be appreciated that the trackpad 110 can be formed in a different shape, such as a circle, without departing from the scope of the techniques described here.

Referring to FIG. 1B, the sensor 152 can be implemented as a flame-retardant class-4 (FR3) printed circuit board. Other components, such as a dome switch, adhesive sheets, and cables (not shown), may also be integrated in (included in) the computing device 100 to process input by a user using the trackpad 110 and/or the keyboard portion 180. Various elements (items and objects) shown on the display device 120 of the computing device 100 can be updated based on various movements of contacts on the trackpad 110 or the keyboard portion 180.

The surface 118 can be configured to be contacted by one or more fingers of a user to actuate and trigger an electrical response within the computing device 100. The surface 118 can be operatively coupled to the sensor 152. The sensor 152 can be activated when a user enters an input on the top surface 118 of the trackpad 110. The input can be contact of one or more fingers of a user with the surface 118 of the trackpad 110 that can be a touch, a swipe, or a click.

The controller 154 can be operatively coupled to the sensor 152. For example, the controller 154 can be an embedded microcontroller chip. In some implementations, the controller 154 can include firmware included in read-only memory (e.g., erasable programmable read only memory (EPROM), electrically erasable programmable read-only memory (EEPROM), Flash ROM). The controller 154 can include a single integrated circuit that includes a processor core, memory, and one or more programmable input/output peripherals. Example for the bus 156 can include, but are not limited to, an inter-integrated circuit (I$^2$C) bus and a serial peripheral interface (SPI) bus. The bus 156 can be operatively coupled to the controller 154 to allow communications with kernel driver 158. The kernel driver 158 can be implemented as firmware included in read-only memory. The kernel driver 158 can include and/or communicate with a gesture library 160. The gesture library 160 can include executable code, data types, functions, and other files (e.g., JAVASCRIPT files) that can be used to process input to the trackpad 110 (e.g., process multi-touch gestures). The gesture library 160, in combination with the kernel driver 158, the bus 156, the controller 154, the sensor 152, and the surface 118, can be used to implement various methods and processes, such as those described in more detail below with respect to FIG. 5, for example.

FIG. 2A is an example block diagram of a top view of an input device (e.g., the trackpad 110) showing a finger 210 of a user contacting the surface 118. A contact, such as the finger 210, can exert pressure on the surface 118. When the finger 210 is first placed on the trackpad 110, the center of the finger 210 is located at and sets an (x1, y1) coordinate location 212 of the finger 210 on the trackpad 110.

Figure 2B:
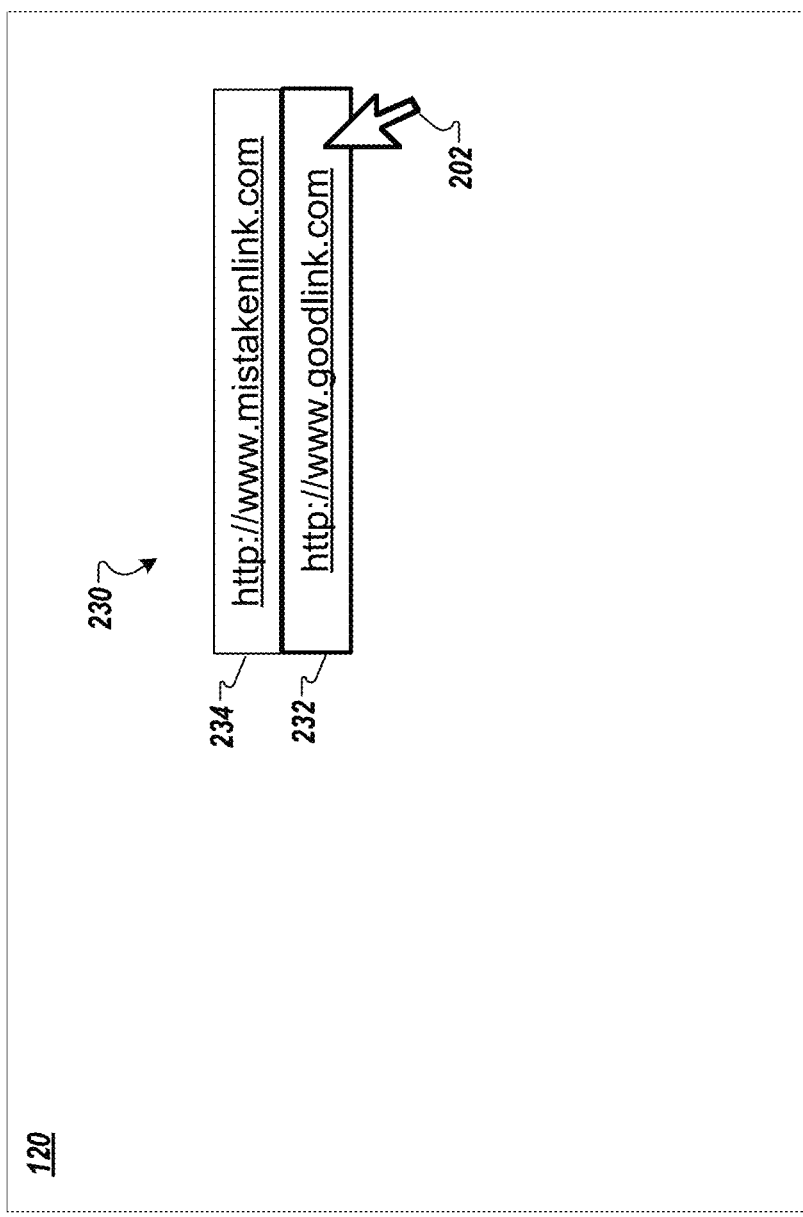
FIG. 2B is an example block diagram of content displayed on a display device with a graphical cursor icon placed partially on an item included in the content.

FIG. 2B is an example block diagram of content 230 displayed on the display device 120, as shown in FIG. 1A, with a graphical cursor icon 202 placed partially on an item 232 included in the content 230. The display device 120 displays (shows) the content 230 that includes the graphical cursor icon 202, and two items or objects (the item 232 and an item 234). Each item 232 and 234 includes a link. Each link represents a uniform resource locator (URL). A user intends to select item 232 by placing the cursor icon 202 on at least a portion of the item 232. Referring to FIG. 2A, the user can place the cursor icon 202 on the portion of the item 232 by moving the finger 210 of the user to the (x1, y1) coordinate location 212 of the finger 210 on the trackpad 110.

FIG. 2C is an example block diagram of a top view of the input device (e.g., the trackpad 110) showing the finger 210 of the user contacting the surface 118 while unintentionally moving the finger 210. In some cases, for example when the finger 210 is first placed on the surface 118 of the trackpad 110, the center of the finger 210 may unintentionally move slightly (e.g., shake or wobble as represented by lines 220). The unintentional movement can be translated into movement of the cursor icon 202. Alternatively or additionally, when the finger 210 first touches the surface 118 of the trackpad 110, the trackpad 110 may recognize this as a movement or click, even though the entire finger has not yet touched the trackpad and the user did not intend to move the cursor or to click just yet.

Figure 2D:
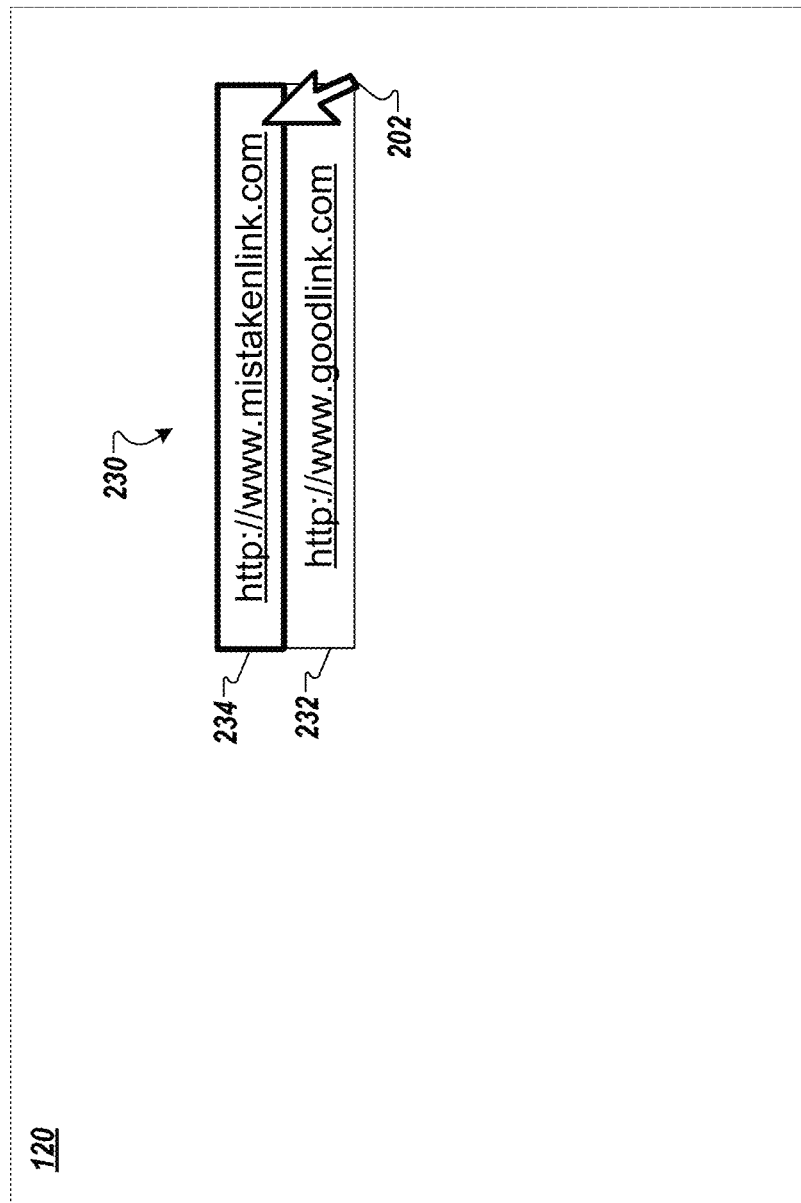
FIG. 2D is an example block diagram of content displayed on a display device with a graphical cursor icon inadvertently placed partially on an item included in the content.

FIG. 2D is an example block diagram of the content 230 displayed on the display device 120, as shown in FIG. 1A, with the graphical cursor icon 202 placed partially on the item 234 included in the content 230. In the example of FIG. 2D, referring to FIG. 2C, the unintentional movement of the finger 210 of the user (e.g., the shake or wobble as represented by lines 220) was translated into movement of the cursor icon 202. The movement of the cursor icon 202 can result in the selection of item 234 when the user intended to select item 232. The unintentional movement of the cursor icon 202 can be referred to as cursor wobble. The selection of item 234 when the user intended to select item 232 may prove frustrating for a user. In addition, it may prove difficult for a user to adjust cursor settings for the computing device 100 to correct for cursor wobble. The methods and systems described herein provide for automatic correction of cursor wobble without requiring additional preferences created by a user.

Figure 3:
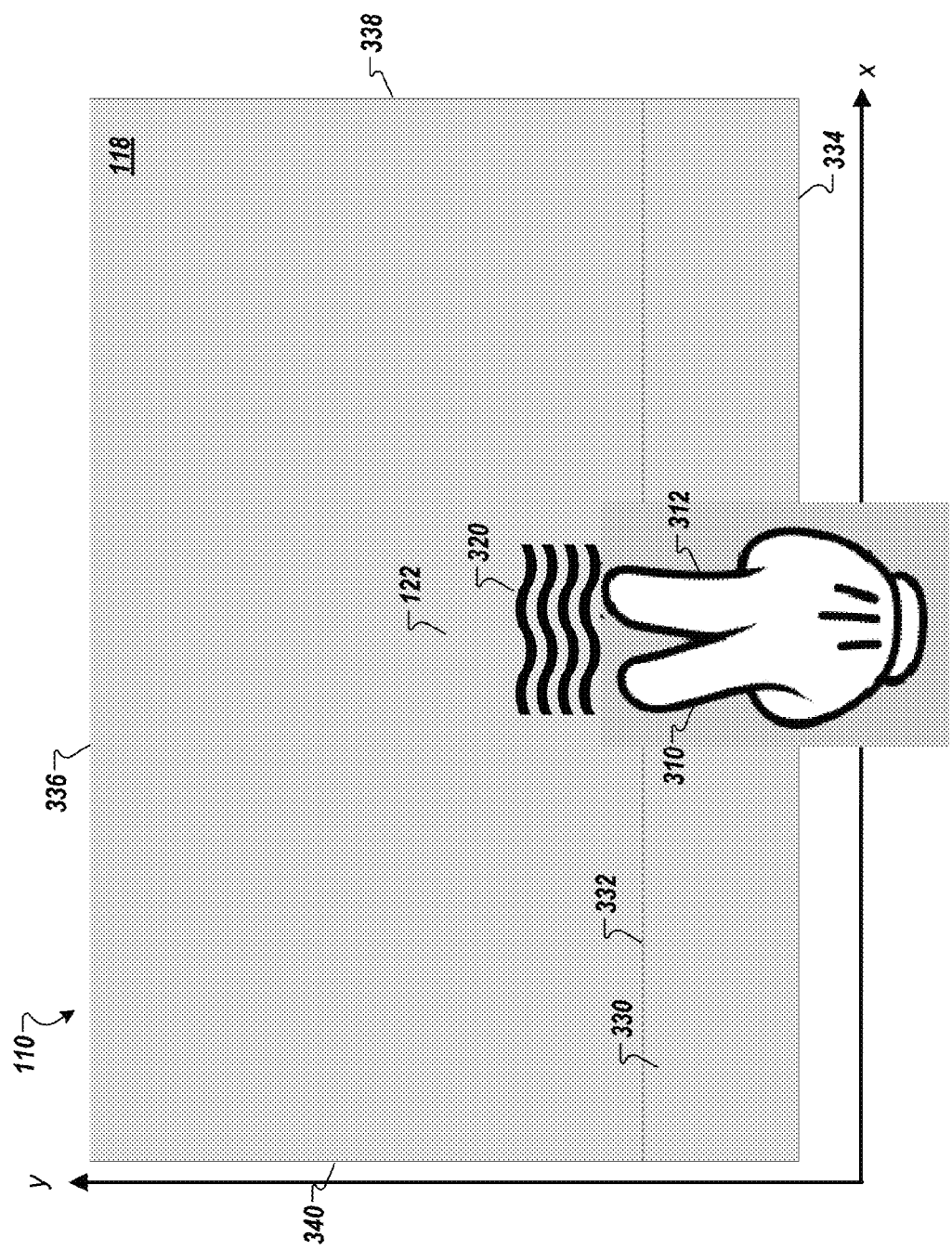
FIG. 3 is a block diagram of a top view of an input device showing a first finger and a second finger of a user contacting a surface of a trackpad.

FIG. 3 is a block diagram of a top view of an input device (e.g., the trackpad 110) showing a finger 310 and a finger 312 of a user contacting the surface 118. In the example shown in FIG. 3, the surface 118 of the trackpad 110 can include a zone 330 (represented by a rectangular area below a dashed line 332). The zone 330 can represent a dampened area of the trackpad 110. The zone 330 can be within one centimeter from a bottom 334, a top 336, a first side 338 and/or a second side 340 of the trackpad 110.

For example, as shown in FIG. 3, a user may have intended to use a finger 310 and a finger 312 to perform a "right click" mouse action using the surface 118 of the trackpad 110. For example, a "right click" mouse action can bring up for display on the display device 120 information or actions associated with an item or object pointed to by a cursor. Instead, any unintentional movement or wobble of the finger 310 and/or the finger 312 may cause unintentional movement of the cursor on the display device 120. The unintentional movement or wobble by the finger 310 and the finger 312 is represented by lines 320. This movement can be considered unintentional because the user really intended to cause a "right click" mouse action. Instead, the trackpad 110 misinterpreted the input by the finger 310 and the finger 312 on the surface 118, and caused a cursor displayed on the display device 120 of the computing device 100 to move slightly.

In some cases, two-finger scrolling may be incorrectly detected in the zone 330 of the trackpad 110. For example, a user may rest multiple fingers in the zone 330. The computing device 100 (e.g., the gesture library 160 as shown in FIG. 1B) can apply one or more rules to mitigate errors in the detection of two-finger scrolling, or other input actions, that are located in the zone 330. For example, a user may place a finger on the surface 118 inadvertently, merely resting the finger on the surface 118, without any other movement of the finger.

In some implementations, the computing device 100 (e.g., the gesture library 160 as shown in FIG. 1B) can detect a palm of a hand of a user on the surface 118 of the trackpad 110. A border around the edge of the trackpad 110 (e.g., a border approximately two centimeters high and two centimeters wide) may be utilized so that the computing device 100 may not consider a new contact that originates in the border as a valid contact until the contact moves a predetermined distance towards a center 122 of the trackpad 110. Once the computing device 100 determines that the contact has moved a predetermined distance towards the center 122 of the trackpad 110, the computing device 100 can determine whether the contact is, for example, a palm or a thumb of the hand of the user. After the computing device 100 determines the contact is a palm of the hand of the user, a set of additional contacts can exist on the trackpad 110 that are known to be non-palms (e.g., fingers).

In some implementations, the computing device 100 (e.g., the gesture library 160 as shown in FIG. 1B) can detect a thumb of a hand of a user on the surface 118 of the trackpad 110. The trackpad 110 can detect a pressure of a contact. The greater the pressure of a contact on the surface 118 of the trackpad, the larger the size of the surface area touched or activated by the contact. In some cases, the trackpad 110 can detect a pressure for a first contact (i.e., a size of the surface area being touched by the contact, which may also be referred to as a capacitance) that is greater than a pressure detected for a second contact. In these cases, the first contact can be considered a thumb, and may be marked as a thumb (e.g., in a record associated with the contact). After detecting a thumb of a user, there can be additional contacts detected on the surface 118 of the trackpad 110. The trackpad can consider these contacts, as well as the second contact, fingers of the user.

One or more detected fingers of the user can perform a gesture. In some implementations, the computing device 100 can detect two fingers performing a gesture on the surface 118 of the trackpad 110 that can be reflected or translated to a scrolling of information being displayed on the display device 120. The trackpad 110 can detect two fingers of a user on a certain portion of the surface 118 of the trackpad 110 (e.g., the finger 310 and the finger 312 as shown in FIG. 3). If the computing device 100 detects the finger 310 and the finger 312 as performing a gesture that can be translated into the scrolling of information on the display device 120, the computing device 100 can check if the finger 310 and/or the finger 312 are contacting the surface 118 of the trackpad 110 in the zone 330.

If the finger 310 and the finger 312 are not contacting the surface 118 of the trackpad 110 in the zone 330, the computing device 100 can proceed to translate the gesture being performed by the finger 310 and the finger 312 into the scrolling of information on the display device 120 (e.g., two-finger scrolling). If one finger of a user (e.g., the finger 310) is in contact with the surface 118 of the trackpad 110 inside the zone 330 and the computing device 100 detects the finger 310 is moving a distance in a direction that is at least half of a distance that the finger 312 detected contacting the surface 118 of the trackpad 110 outside of the zone 330 is moving in, two-finger scrolling can be performed. If one finger of a user (e.g., the finger 310) is in contact with the surface 118 of the trackpad 110 inside the zone 330 and the computing device 100 detects the finger 310 is not moving a distance in a direction that is at least half of a distance that the finger 312 detected contacting the surface 118 of the trackpad 110 outside of the zone 330 is moving in, the computing device 100 can consider the finger 310 in contact with the surface 118 of the trackpad 110 inside of the zone 330 to be a resting finger.

If the finger 310 and the finger 312 are in contact with the surface 118 of the trackpad 110 inside of the zone 330, the computing device 100 can determine an amount of movement on the surface 118 of the trackpad 110 for each finger 310 and 312 (a distance that each finger 310 and 312 has moved or traveled on the surface 118 of the trackpad 110). If the computing device 100 determines that the finger 310 is moving a distance that is less that a distance being moved by the finger 312, then the computing device 100 can apply existing logic for having one finger in contact with the surface 118 of the trackpad 110 in the zone 330. By applying such logic, one result is that both fingers generally would need to be moving around the same speed to trigger scrolling if they were both in the zone 330. Thus, the system may avoid erroneously designating a "resting" finger as a "scrolling" finger, or as other input, when the user did not intend for that finger to make any movement at all.

Referring to FIG. 1A, as described herein, blocking cursor wobble can include maintaining a position of a cursor on the display device 120 by ignoring a detected movement of a contact on the surface 118 of the trackpad 110. The detected contact movement is not translated into movement of the cursor on the display device 120.

Figure 4:
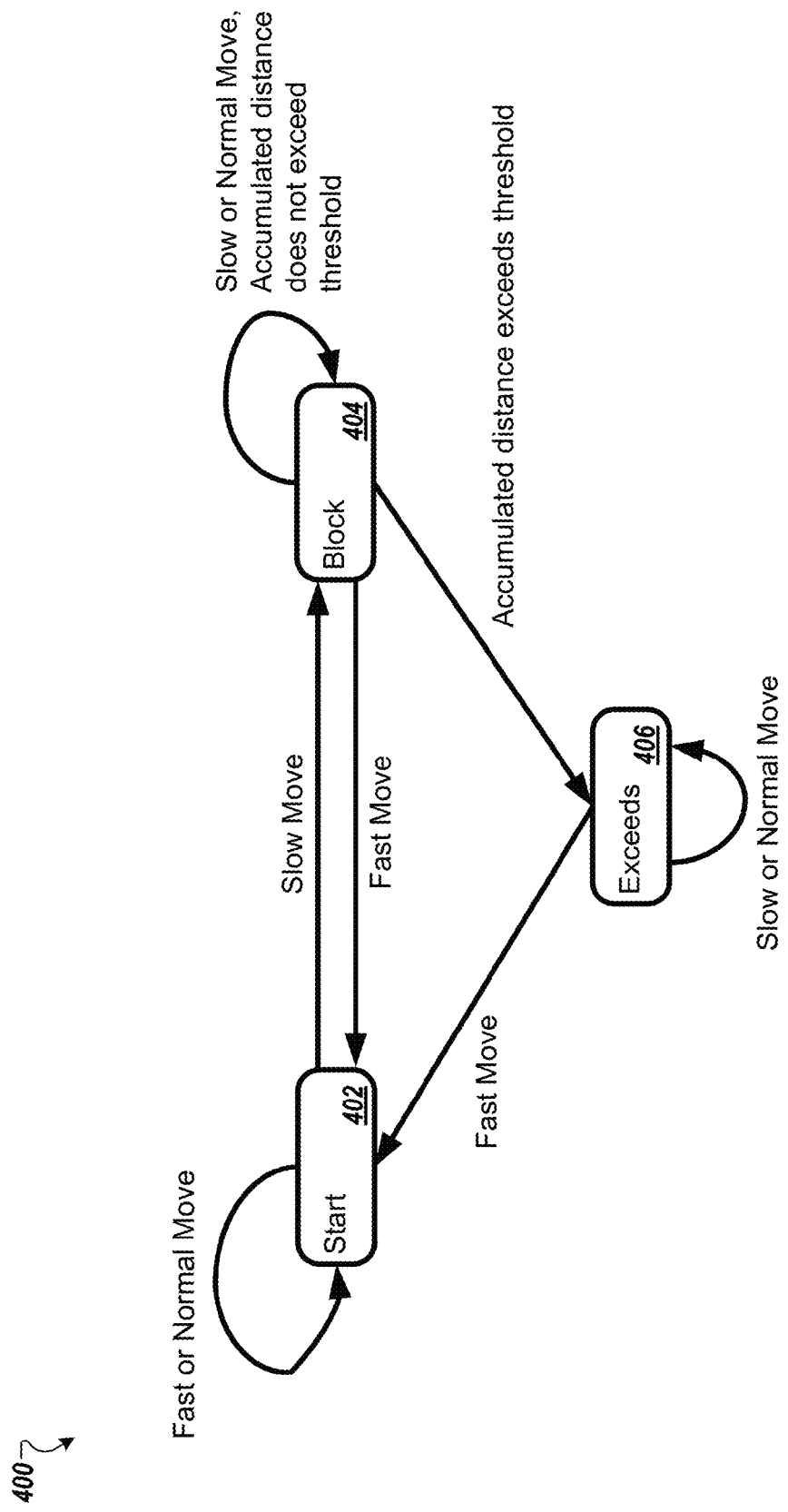
FIG. 4 is an example state diagram for tracking and classifying movements of a finger of a user on a surface of a trackpad.

FIG. 4 is an example state diagram 400 for tracking and classifying movements of a finger of a user on a surface of a trackpad. For example, a movement of a finger can be classified as one of three speeds: slow, normal, or fast. The movement of each finger of a user can be separately tracked into one of three states: a start state 402, a block state 404 or an exceeds state 406.

For each contact (defined herein as any acceptable contact on/with the surface 118 of the trackpad 110 that the trackpad 110 (computing device 100) recognizes as a valid input, such as the contact of a finger, a thumb, etc.) that is currently detected on the surface 118 of the trackpad 110, the computing device 100 can maintain information about the contact in a record associated with the contact for use in avoiding cursor wobble. The computing device 100 can maintain the records on a per-finger basis (e.g., one record per finger). If there are three fingers on the trackpad at a given time, for example, at that time there would be three distinct records.

A record can include any or all of the following information for a contact. The record can include an (x, y) coordinate that can be the initial coordinate determined when the contact was first detected on the surface 118 of the trackpad 110. The record can include a value for a total distance moved/traveled for the finger since contact of the finger on the surface 118 of the trackpad 110 was first detected. The record can include a distance traveled by the finger on the surface 118 of the trackpad 110 between two consecutive frames of input. For example, referring to FIG. 1A, the movement of a cursor and/or other motion or movement of information on the display device 120 can be the result of detecting the movement of a finger of a user on the surface 118 of the trackpad 110 between two frames of input. In some cases, the frames can be two consecutive frames of input. Each frame of input data can be captured in milliseconds or other measures, for example nanoseconds, or any measure of duration.

The distance traveled by the finger on the surface 118 of the trackpad 110 between two consecutive frames of captured input data and the input data frame capture rate can be used to determine a speed of movement of the finger on the surface 118 of the trackpad 110. The distance traveled by the finger on the surface 118 of the trackpad 110 can be calculated as the difference between a first (x, y) coordinate (x1, y1) for a first contact of the finger on the surface 118 of the trackpad 110 and a second (x, y) coordinate (x2, y2) for a second contact of the finger on the surface 118 of the trackpad 110. The first (x, y) coordinate (x1, y1) for the first contact of the finger can be determined for a first frame of captured input data and the second (x, y) coordinate (x2, y2) for the second contact of the finger can be determined for a second frame of captured input data. In some cases, the first frame of captured input data and the second frame of captured input data can be consecutively captured frames of input data. In some cases, the first frame of captured input data and the second frame of captured input data may not be consecutively captured frames of input data (e.g., every other captured frame of input data).

As described, the finger movement can be classified into one of three speeds: slow, medium, and fast. For example, if the determined distance traveled by the finger on the surface 118 of the trackpad 110 between two consecutive frames of captured input data is 0.047 millimeters (mm) and the input data frame capture rate is once every millisecond (msec.) (1000 frames per second), the calculated speed of movement of the finger of the user is 47 millimeters/second (mm/sec.). A finger moving at this fast threshold speed or faster (greater or more) than this fast threshold speed can be considered/classified as moving at a fast speed. A finger moving at this threshold rate/speed or faster can be considered/classified as moving at a fast speed.

In another example, if the determined distance traveled by the finger on the surface 118 of the trackpad 110 between two consecutive frames of captured input data is 0.002 mm and the input data frame capture rate is once every millisecond, the calculated speed of movement of the finger of the user is two mm/sec. A finger moving at this slow threshold speed or slower (less) than this slow threshold speed can be considered/classified as moving at a slow speed. A finger moving at this threshold rate/speed or slower can be considered/classified as moving at a slow speed.

Based on the two examples, if the determined rate/speed of movement of the finger on the surface 118 of the trackpad 110 is between the slow threshold value (e.g., two mm/sec.) and the fast threshold value (e.g., 47 mm/sec), the finger can be considered/classified as moving at a normal speed. For example, if the determined rate/speed of movement of the finger is greater than two mm/sec. and less than 47 mm/sec., the finger can be considered/classified as moving at a normal speed.

In some implementations, the distance traveled by the finger on the surface 118 of the trackpad 110 between frames of captured input data that are not consecutive and the input data frame capture rate can be used to determine a speed of movement of the finger on the surface 118 of the trackpad 110. For example, the movement speed of the finger can be calculated at every other frame (alternate frames) of captured input data. In another example, the movement speed of the finger can be calculated at every third frame of captured data. In some cases, the determination of when to calculate the movement speed of a finger can be based on the captured input data frame rate. For example, the finer (faster) the frame rate, the less often the movement speed of the finger may be calculated.

A first detected contact of a finger of a user with the surface 118 of the trackpad 110 can be the start state 402. In the start state 402, the finger of a user can move freely on the surface 118 of the trackpad 110, the movement being directly reflected/translated to movement of a cursor on a display device 120 or to scrolling of information on the display device 120 as long as the calculated speed of the movement of the finger on the surface 118 of the trackpad 110 is maintained at a normal or fast speed. If the calculated speed of movement of the finger on the surface 118 of the trackpad 110 is determined to be slow, the block state 404 is entered. In the block state 404, movement of the finger on the surface 118 of the trackpad 110 is not directly reflected/translated to movement of a cursor on the display device 120. The movement of the finger on the surface 118 of the trackpad 110 is blocked from moving the cursor or from scrolling information on the display device 120.

While in the block state 404, the total distance the finger is moving on the surface 118 of the trackpad 110 is calculated and tracked. In some implementations, the total distance the finger is moving can be calculated at the input data frame capture rate (once with every input data frame captured). In some implementations, the total distance the finger is moving can be calculated at rate that is less than or slower than the input data frame capture rate (e.g., once every other captured input data frame).

If, while in the block state 404, the calculated total distance the finger is moving meets or exceeds a threshold value (e.g., is greater than or equal to one millimeter), the exceeds state 406 is entered. Entering the exceeds state 406 indicates that the finger is moving on the surface 118 of the trackpad 110 at a slow but steady, continuous rate/speed for a prolonged period of time (e.g., the finger is moving at 2 mm/sec. for one second). This type of movement should be allowed. In the exceeds state 406 the movement of the finger on the surface 118 of the trackpad 110 is not blocked from moving the cursor or from scrolling information on the display device 120. In addition or in the alternative, the calculated total distance (the accumulated total distance) the finger moved on the surface 118 of the trackpad 110 when the block state 404 was exited is cleared.

While in the exceeds state 406, the speed of movement of the finger on the surface 118 of the trackpad 110 continues to be calculated. If it is determined that the finger is moving at a fast speed (moving at a speed greater than or equal to a fast threshold speed), the start state 402 is again entered. When entering the start state 402 (and exiting the exceeds state 406), the movement of the finger on the surface 118 of the trackpad 110 can continue to be translated to cursor movement or to scrolling of information on the display device 120. As described, while in the start state 402, as long as the calculated movement speed of the finger is determined to be at a normal speed or a fast speed, the finger of a user can move freely on the surface 118 of the trackpad 110, the movement being directly reflected/translated to movement of a cursor on a display device 120 or to scrolling of information on the display device 120.

While in the block state 404, the speed of movement of the finger on the surface 118 of the trackpad 110 continues to be calculated. If it is determined that the finger is moving at a fast speed (moving at a speed greater than or equal to a fast threshold speed), the start state 402 is again entered. When entering the start state 402 (and exiting the block state 404), the movement of the finger on the surface 118 of the trackpad 110 is no longer blocked from moving the cursor or from scrolling information on the display device 120. In addition or in the alternative, the calculated total distance (the accumulated total distance) the finger moved on the surface 118 of the trackpad 110 when the block state 404 was exited is cleared. As described, while in the start state 402, as long as the calculated movement speed of the finger is determined to be at a normal speed or a fast speed, the finger of a user can move freely on the surface 118 of the trackpad 110, the movement being directly reflected/translated to movement of a cursor on a display device 120 or to scrolling of information on the display device 120.

Figure 5:
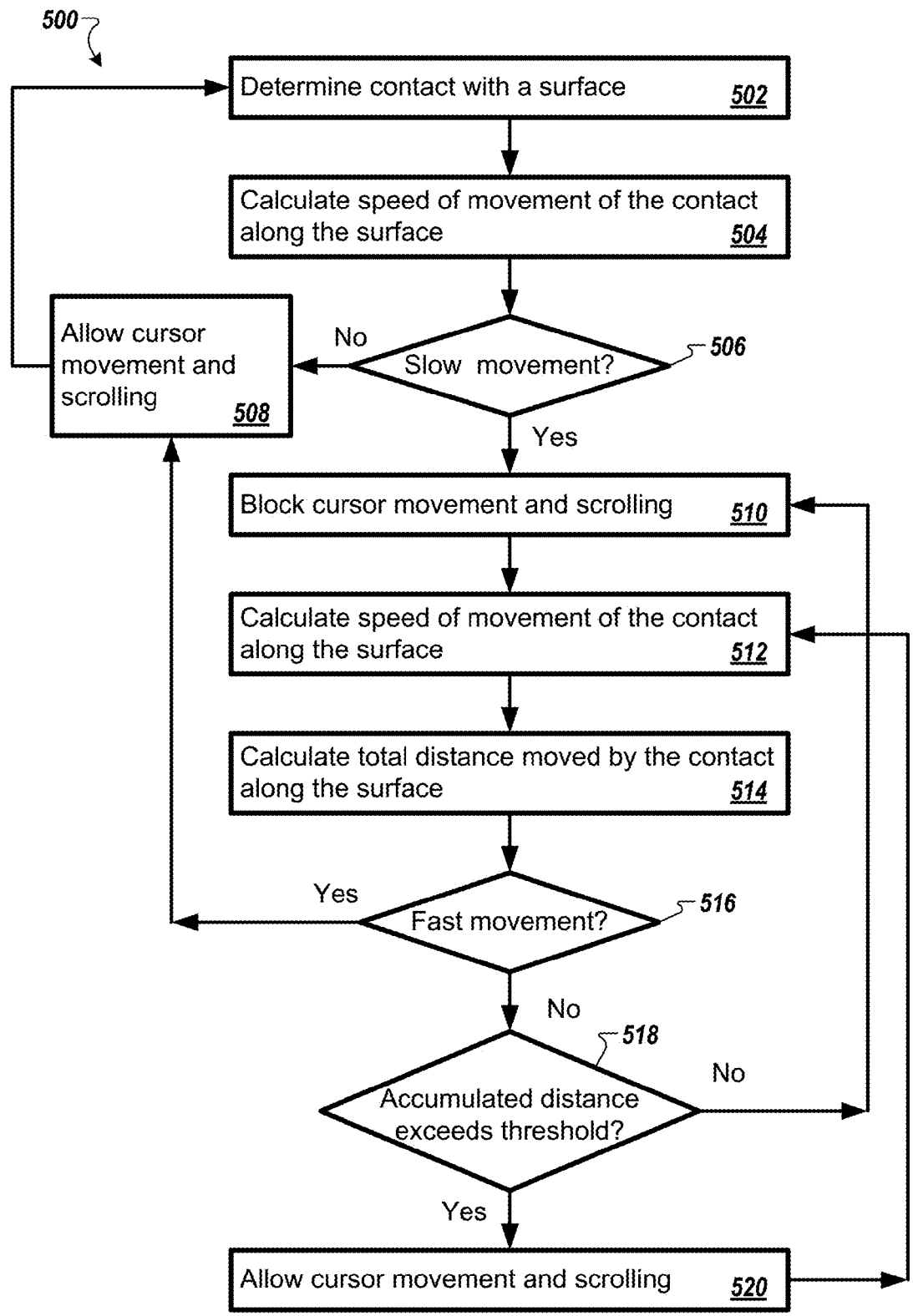
FIG. 5 is a flow diagram of an example method that can be used to mitigate cursor wobble.

FIG. 5 is a flow diagram of an example method 500 that can be used to mitigate cursor wobble. The method 500 can be executed, for example referring to FIG. 1B, by a microcontroller of a computing device (e.g., the controller 154) and/or can be implemented as part of the gesture library 160. The method 500 is an example only, and may have steps added, deleted, reordered, or modified. The method 500 can be applied for each contact (e.g., finger) for every received frame of input data (of which there may be, for example, 1000 per second). For example, referring to FIG. 1A, the movement of a cursor and/or other motion or movement of information on the display device 120 (e.g., scrolling) can be the result of detecting the movement of a finger of a user on the surface 118 of the trackpad 110 between two consecutive frames of input. Each frame of input data can be captured in milliseconds or other measures, for example nanoseconds, or any measure of duration.

Contact with a surface of a touchpad is determined (block 502). For example, as described herein and referring to FIGS. 1A-B, a user can place one or more fingers of the user on the surface 118 of the trackpad 110. Speed of the movement of the contact along the surface is calculated (block 504). For example, an (x, y) coordinate for the contact in the current frame of input data is compared to an (x,y) coordinate for the contact from a past frame of input data. The (x,y) coordinate for the contact from the past frame of input data can be stored in the record associated with the contact. Using the sampling rate for each frame of input data (e.g., a frame of input data can be sampled sixty times or more per second), the speed of movement of the contact can be calculated. In some implementations, the speed can be calculated after every frame sample. In some implementations, multiple frame samples may be taken between speed calculations.

It is determined if the speed of movement of the contact is slow (block 506). For example, the calculated speed of movement of the contact is compared to a slow movement threshold value (e.g., two mm/sec.). If the calculated speed of movement is below (less than) or equal to the slow movement threshold value, the movement of the contact is classified as slow.

If it is determined that the speed of movement of the contact is not slow (block 506) (e.g., the speed of movement is faster than (greater than) a slow movement threshold value (e.g., two mm/sec.), cursor movement and scrolling are allowed (block 508). Since the speed of movement of the contact is not slow, movement of the contact can be translated into cursor movements or scrolling of information on a display device (e.g., the display device 120). The method 500 continues to determine the contact with the surface of the touchpad (block 502) and to calculate the speed of the movement of the contact along the surface (block 504).

If it is determined that the speed of movement of the contact is slow (block 506) (e.g., the speed of movement is slower than (less than or below) or equal to a slow movement threshold value (e.g., two mm/sec.), cursor movement and scrolling are blocked (block 510). For example, the slow movement may indicate unintentional movement (wobble)

of the finger of the user when contacting the surface 118 of the trackpad 110. If this is the case, it would be beneficial not to translate the unintentional movement of the contact to what would be considered unintentional movement of a cursor or unintentional scrolling.

Speed of the movement of the contact along the surface is again calculated (block 512). As described above, for example, an (x, y) coordinate for the contact in the current frame of input data is compared to an (x,y) coordinate for the contact from a past frame of input data. The (x,y) coordinate for the contact from the past frame of input data can be stored in the record associated with the contact. Using the sampling rate for each frame of input data (e.g., a frame of input data can be sampled sixty times or more per second), the speed of movement of the contact can be calculated. In some implementations, the speed can be calculated after every frame sample. In some implementations, multiple frame samples may be taken between speed calculations.

A value for a total distance moved by the contact along the surface is calculated (block 514). For example, a current (x, y) coordinate for the contact in the current frame of input data can be compared to a past (x,y) coordinate for the contact from a past frame of input data. The (x,y) coordinate for the contact from the past frame of input data can be stored in the record associated with the contact. A value for a distance moved by the contact between the current frame of input data and the past frame of input data is the difference between the current (x,y) coordinate and the past (x,y) coordinate. The calculated value for the distance is the absolute value of the difference between the current (x,y) coordinate and the past (x,y) coordinate. The calculated value for the distance moved by the contact between the current frame of input data and the past frame of input data is independent of direction. This calculated value for the distance can be added to a previous accumulated value of calculated distance values from past measurements for the contact, keeping a running total of the distance moved by the contact in a given time period.

For example, the time period can begin when slow movement of the contact is first determined (in block 506). A value for the total distance moved by the contact can be included (maintained) in a record associated with the contact. The value for the total distance is an accumulated value of distances traveled/moved by the contact over a period of time (e.g., from first detection of the contact on the surface 118 of the trackpad 110). In some implementations, the distance moved by the contact can be calculated after every frame sample and the total distance moved by the contact can be updates after every frame sample. In some cases, multiple frame samples may be taken between distance calculations and subsequent updates to the total distance.

It is determined if the speed of movement of the contact is fast (block 516). For example, the calculated speed of movement of the contact is compared to a fast movement threshold value (e.g., 47 mm/sec.). If the calculated speed of movement is above (greater than) or equal to the fast movement threshold value, the movement of the contact is classified as fast.

If it is determined that the speed of movement of the contact is fast (block 516) (the speed of movement is faster than (greater than) or equal to a fast threshold value (e.g., 47 mm/sec.)), cursor movement and scrolling are allowed (not blocked) (block 508). For example, the fast movement may indicate the finger of the user is no longer moving unintentionally because of the increased speed of movement of the finger when contacting the surface 118 of the trackpad 110. If this is the case, it would be beneficial to begin and/or continue to translate the movement of the contact to what is determined to be intentional movement of a cursor or scrolling.). The method 500 continues to determine the contact with the surface of the touchpad (block 502) and to calculate the speed of the movement of the contact along the surface (block 504).

If it is determined that the speed of movement of the contact is not fast (block 516) (the speed of movement is slower than (less than) a fast movement threshold value (e.g., 47 mm/sec.)), it is determined if the value for the total distance exceeds a threshold (block 518). For example, a user may be moving a finger of the user along the surface 118 of the trackpad 110 at a slow, steady rate. This movement can be intentional by the user and, therefore, should be translated into cursor movement and/or scrolling on the display device. A total distance threshold can be determined such that if the value for the total distance moved by the contact over a particular time period exceeds the total distance threshold, this indicates that the detected movement of the finger was intentional and not wobble.

If it is determined that the value for the total distance does not exceed a threshold (block 518), the method 500 continues to block (not allow) cursor movement and scrolling (block 510). If it is determined that the value for the total distance does exceed a threshold (block 518), cursor movement and scrolling is allowed (block 520). The method 500 continues to calculate a speed of the movement of the contact along the surface (block 512) and to calculate a value for a total distance moved by the contact along the surface (block 514). In the cases where the user may be moving a finger of the user along the surface 118 of the trackpad 110 at a slow, steady rate, the total distance will continue to exceed a threshold (block 518) and cursor movement and scrolling will be allowed (block 520).

Although the descriptions in FIGS. 1A-B, 2A-D, 3, 4, and 5 are generally focused on trackpads, the implementations described with respect to FIGS. 1A-B, 2A-D, 3, 4, and 5 may also be utilized in conjunction with touchscreens or any other input devices that may be utilized in conjunction with various displays that may experience cursor wobble. Additional examples of computing devices with various input devices that may be used to suppress cursor wobble are depicted in FIG. 6.

Figure 6:
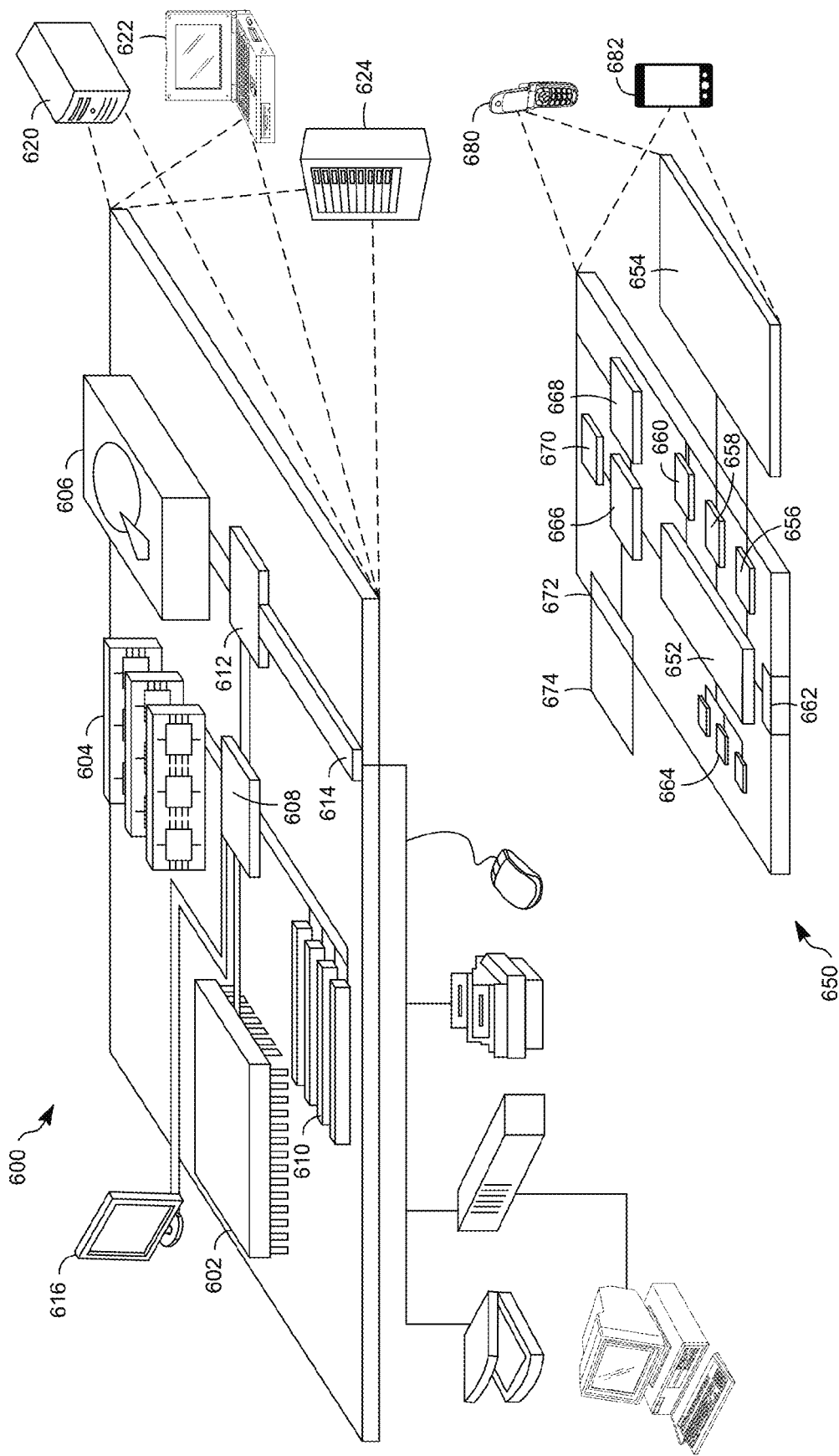
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   identifying a contact on a surface of a trackpad of a computing device;
   calculating a value of a first speed of movement of the contact along the surface of the trackpad;
   allowing movement of a cursor on a display device included in the computing device if the value of the first speed of movement of the contact along the surface of the trackpad is determined to be greater than a slow threshold speed;
   blocking movement of the cursor on the display device if the value of the first speed of movement of the contact along the surface of the trackpad is determined to be equal to or less than the slow threshold speed;
   subsequent to a blocking of the movement of the cursor on the display device, calculating a second speed of movement of the contact along the surface of the trackpad;
   calculating a value of an accumulated distance moved by the contact along the surface of the trackpad; and
   continuing the blocking of the movement of the cursor on the display device based on:
      determining that the value of the second speed of movement of the contact along the surface of the trackpad is greater than the slow threshold speed and less than a fast threshold speed, and
      determining that the value of the accumulated distance moved by the contact along the surface of the trackpad is less than a threshold distance value.

2. The method of claim 1, wherein blocking movement of the cursor on the display device includes blocking scrolling of information on the display device.

3. The method of claim 1,
   wherein the method further includes allowing movement of the cursor on the display device included in the computing device, based on determining that the value of the second speed of movement of the contact along the surface of the trackpad is equal to or greater than the fast threshold speed.

4. The method of claim 1, wherein calculating a value of a first speed of movement of the contact along the surface of the trackpad comprises calculating the value of the first speed of movement of the contact to be a distance between a current (x,y) coordinate and a previous (x,y) coordinate over a period of time.

5. The method of claim 4, wherein the period of time is the time between two frames of input data.

6. The method of claim 1, wherein calculating a value of an accumulated distance moved by the contact along the surface of the trackpad comprises calculating the value of the accumulated distance to be an accumulated sum of distances moved by the contact along the surface of the trackpad.

7. The method of claim 1, wherein the method further includes allowing movement of a cursor on a display device included in the computing device, based on determining that the value of the accumulated distance moved by the contact along the surface of the trackpad is greater than or equal to the threshold distance value.

8. The method of claim 1,
wherein the slow threshold speed is a precalculated speed of movement of the contact between two sequential frames of captured data, and
wherein the fast threshold speed is a precalculated speed of movement of the contact between two sequential frames of captured data.

9. A non-transitory, machine-readable medium having instructions stored thereon, the instructions, when executed by a processor, cause a computing device to:
identify a contact on a surface of a trackpad of a computing device;
calculate a value of a first speed of movement of the contact along the surface of the trackpad;
allow movement of a cursor on a display device included in the computing device if the value of the first speed of movement of the contact along the surface of the trackpad is determined to be greater than a slow threshold speed;
block movement of the cursor on the display device if the value of the first speed of movement of the contact along the surface of the trackpad is determined to be equal to or less than the slow threshold speed;
subsequent to a blocking of the movement of the cursor on the display device, calculate a second speed of movement of the contact along the surface of the trackpad;
calculate a value of an accumulated distance moved by the contact along the surface of the trackpad; and
continue to block the movement of the cursor on the display device based on:
determining that the value of the second speed of movement of the contact along the surface of the trackpad is greater than the slow threshold speed and less than a fast threshold speed, and
determining that the value of the accumulated distance moved by the contact along the surface of the trackpad does not exceed a threshold distance value.

10. The medium of claim 9, wherein blocking movement of the cursor on the display device includes blocking scrolling of information on the display device.

11. The medium of claim 9, wherein the instructions, when executed by the processor, further cause the computing device to:
allow movement of the cursor on the display device included in the computing device, based on determining that the value of the second speed of movement of the contact along the surface of the trackpad is equal to or greater than the fast threshold speed.

12. The medium of claim 9, wherein the instructions, when executed by the processor, that cause the computing device to calculate a value of a first speed of movement of the contact along the surface of the trackpad include instructions that, when executed by the processor, cause the computing device to calculate the value of the first speed of movement of the contact to be a distance between a current (x,y) coordinate and a previous (x,y) coordinate over a period of time.

13. The medium of claim 12, wherein the period of time is the time between two frames of input data.

14. The medium of claim 9, wherein the instructions, when executed by the processor, that cause the computing device to calculate a value of an accumulated distance moved by the contact along the surface of the trackpad further include instructions that, when executed by the processor, cause the computing device to calculate the value of the accumulated distance to be an accumulated sum of distances moved by the contact along the surface of the trackpad.

15. The medium of claim 9, wherein the instructions, when executed by the processor, further cause the computing device to allow movement of a cursor on a display device included in the computing device, based on determining that the value of the accumulated distance moved by the contact along the surface of the trackpad is greater than or equal to the threshold distance value.

16. The medium of claim 9,
wherein the slow threshold speed is a precalculated speed of movement of the contact between two sequential frames of captured data, and
wherein the fast threshold speed is a precalculated speed of movement of the contact between two sequential frames of captured data.

17. A trackpad comprising:
a surface;
a sensor operatively coupled to the surface and configured to identify a contact on the surface of the trackpad;
a controller operatively coupled to the sensor and configured to:
calculate a value of a first speed of movement of the contact along the surface of the trackpad;
calculate a value of a second speed of movement of the contact along the surface of the trackpad subsequent to the calculating of the value of the first speed of movement of the contact along the surface of the trackpad; and
calculate a value of an accumulated distance moved by the contact along the surface of the trackpad;
a bus operatively coupled to the controller;
a kernel driver configured to communicate with the bus; and
a gesture library configured to communicate with the kernel driver,
the gesture library including executable code to translate a movement of the contact on the surface of the trackpad to movement of a cursor on a display device if the value of the first speed of movement of the contact along the surface of the trackpad is determined to be greater than a slow threshold speed; and
the gesture library including executable code to not translate a movement of the contact on the surface of the trackpad to movement of the cursor on the display device based on:
determining that the value of the first speed of movement of the contact along the surface of the trackpad is equal to or less than the slow threshold speed, determining that the value of the second speed of movement of the contact along the surface of the trackpad is greater than the slow threshold speed and less than a fast threshold speed, and determining that the value of the accumulated distance moved by the contact along the surface of the trackpad is less than a threshold distance value.

18. The trackpad of claim 17, wherein the gesture library includes executable code to translate the movement of the contact on the surface of the trackpad to movement of the cursor on the display device, based on determining that the value of the second speed of movement of the contact along the surface of the trackpad is equal to or greater than the fast threshold speed.

19. The trackpad of claim 17, wherein the gesture library includes executable code to translate the movement of the contact on the surface of the trackpad to movement of the cursor on the display device, based on determining that the value of the accumulated distance moved by the contact along the surface of the trackpad is greater than or equal to the threshold distance value.

20. The trackpad of claim 17, the controller further configured to:

precalculate the slow threshold speed as a speed of movement of the contact between two sequential frames of captured data; and precalculate the fast threshold speed as a speed of movement of the contact between two sequential frames of captured data.

* * * * *